United States Patent
Ghosh et al.

(10) Patent No.: US 10,021,556 B2
(45) Date of Patent: *Jul. 10, 2018

(54) AUTOMATIC SEAMLESS CONTEXT SHARING ACROSS MULTIPLE DEVICES

(71) Applicant: Intel Corporation, Santa Clara, CA (US)

(72) Inventors: Abhirup Ghosh, Bishnupur (IN); Piyush Joshi, Banglore (IN); Satish Shivarudrappa, Banglore (IN)

(73) Assignee: Intel Corporation, Santa Clara, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/976,300

(22) Filed: Dec. 21, 2015

(65) Prior Publication Data
US 2016/0192173 A1     Jun. 30, 2016

Related U.S. Application Data

(63) Continuation of application No. 14/517,213, filed on Oct. 17, 2014, now Pat. No. 9,219,987, which is a (Continued)

(51) Int. Cl.
*H04W 4/00* (2018.01)
*H04W 8/00* (2009.01)
(Continued)

(52) U.S. Cl.
CPC ............. *H04W 8/005* (2013.01); *H04L 29/08* (2013.01); *H04L 67/1068* (2013.01);
(Continued)

(58) Field of Classification Search
CPC ..... H04B 5/0075; H04B 17/318; H04B 24/00
(Continued)

(56) References Cited

U.S. PATENT DOCUMENTS 7,359,714 B2    4/2008  Parupudi et al.
8,509,483 B2    8/2013  Inigo
(Continued)

FOREIGN PATENT DOCUMENTS

CN       104782220 A      7/2015
WO    WO-2014077900 A1    5/2014

OTHER PUBLICATIONS

"U.S. Appl. No. 13/679,261, Notice of Allowance dated Jul. 7, 2014", 11 pgs.
(Continued)

*Primary Examiner* — Iqbal Zaidi
(74) *Attorney, Agent, or Firm* — Schwegman, Lundberg & Woessner, P.A.

(57) ABSTRACT

Embodiments of a system and method for automatic context sharing across multiple devices are generally described herein. In some embodiments, an application context information transfer technique is provided that is capable of detecting when the user is moving away from or towards a stationary or fixed-location computing device, and transferring application context information to or from a mobile device. The application content information transferred between devices may include information that allows the user to continue a computing device activity on the mobile device or continue mobile device activity on the computing device, such as editing a document, reading a website article, or viewing a streaming video. The techniques described herein may be used to automate the transfer of such application context information between devices.

18 Claims, 8 Drawing Sheets

Related U.S. Application Data continuation of application No. 13/679,261, filed on Nov. 16, 2012, now Pat. No. 8,880,051.

(51) Int. Cl.
| | |
|---|---|
| *H04W 4/80* | (2018.01) |
| *H04L 29/08* | (2006.01) |
| *H04W 4/02* | (2018.01) |
| *H04W 48/10* | (2009.01) |
| *H04W 72/08* | (2009.01) |
| *H04W 4/06* | (2009.01) |

(52) U.S. Cl.
CPC .......... *H04L 67/1072* (2013.01); *H04L 67/18* (2013.01); *H04W 4/00* (2013.01); *H04W 4/008* (2013.01); *H04W 4/02* (2013.01); *H04W 4/023* (2013.01); *H04W 4/80* (2018.02); *H04W 48/10* (2013.01); *H04W 72/085* (2013.01); *H04W 4/027* (2013.01); *H04W 4/06* (2013.01)

(58) Field of Classification Search
USPC .......................... 370/328–339; 455/440, 456
See application file for complete search history.

(56) References Cited

U.S. PATENT DOCUMENTS

| | | | |
|---|---|---|---|
| 8,750,850 B2 | 6/2014 | Gupta | |
| 8,830,909 B1* | 9/2014 | Octeau ................. | H04W 4/025 370/328 |
| 9,219,987 B2 | 12/2015 | Ghosh et al. | |
| 2006/0223556 A1 | 10/2006 | Xu et al. | |
| 2007/0083535 A1 | 4/2007 | Zilliacus et al. | |
| 2008/0242418 A1 | 10/2008 | Theimer et al. | |
| 2009/0234909 A1* | 9/2009 | Strandell ........... | G06F 17/30528 709/203 |
| 2011/0012743 A1* | 1/2011 | Van Gorp .............. | G08C 17/02 340/686.6 |
| 2011/0225368 A1 | 9/2011 | Burge, III | |
| 2012/0016961 A1 | 1/2012 | Tuikka et al. | |
| 2012/0284256 A1 | 11/2012 | Mahajan et al. | |
| 2013/0005383 A1 | 1/2013 | Isberg et al. | |
| 2014/0090033 A1 | 3/2014 | Lerner et al. | |
| 2014/0141714 A1 | 5/2014 | Ghosh et al. | |
| 2015/0172866 A1 | 6/2015 | Ghosh et al. | |

OTHER PUBLICATIONS

"U.S. Appl. No. 14/517,213, Non Final Office Action dated Apr. 21, 2015", 5 pgs.

"U.S. Appl. No. 14/517,213, Notice of Allowance dated Aug. 13, 2015", 5 pgs.

"U.S. Appl. No. 14/517,213, Preliminary Amendment filed Mar. 2, 2015", 9 pgs.

"U.S. Appl. No. 14/517,213, Response filed Jul. 21, 2015 to Non Final Office Action dated Apr. 21, 2015", 10 pgs.

"European Application Serial No. 13855503.2, Extended European Search Report dated Jul. 4, 2016", 7 pgs.

"European Application Serial No. 13855503.2, Response filed Apr. 27, 2017 to Extended European Search Report dated Jul. 4, 2016", 23 pgs.

"International Application Serial No. PCT/US2013/044669, International Preliminary Report on Patentability dated May 28, 2015", 8 pgs.

"International Application Serial No. PCT/US2013/044669, International Search Report dated Aug. 21, 2013", 3 pgs.

"International Application Serial No. PCT/US2013/044669, Written Opinion dated Aug. 21, 2013", 6 pgs.

Austrem, Paul, ""Seamless Application" for seamless and personal mobile computing", Proceedings of the 14th Conference on Pattern Languages of Programs, (2007), 13 pgs.

Austrem, Paul, "A Design Pattern for the Transfer of Running Applications between Devices", [Online]. Retrieved from the Internet: <URL: http://www.techrepublic.com/whitepapers/a-design-pattern-for-the-transfer-of-running-applications-between-devices/3895815>, (2007), 10 pgs.

Dachselt, Taimund, et al., "Throw and Tilt—Seamless Interaction across Devices Using Mobile Phone Gestures", Mobile and Embedded Interactive Systems, (2008), 272-276.

Hardesty, Larry, "You can take it with you", MIT News, [Online]. Retrieved from the Internet: <URL: http://web.mit.edu/newsoffice/2011/deep-shot-0616.html>, (Jun. 16, 2011), 3 pgs.

U.S. Appl. No. 13/679,261, filed Nov. 16, 2012, Automatic Seamless Context Sharing Across Multiple Devices, U.S. Pat. No. 8,880,051.

U.S. Appl. No. 14/517,213, filed Oct. 17, 2014, Automatic Seamless Context Sharing Across Multiple Devices, U.S. Pat. No. 9,219,987.

"European Application Serial No. 13855503.2, Communication Pursuant to Article 94(3) EPC dated Feb. 13, 2018", 10 pgs.

\* cited by examiner

AUTOMATIC SEAMLESS CONTEXT SHARING ACROSS MULTIPLE DEVICES

PRIORITY APPLICATION

This application is a continuation of U.S. application Ser. No. 14/517,213, filed Oct. 17, 2014, which is a continuation of U.S. application Ser. No. 13/679,261, filed Nov. 16, 2012, now issued as U.S. Pat. No. 8,880,051, all of which are incorporated herein by reference in their entirety.

TECHNICAL FIELD

Embodiments pertain to operations in mobile and fixed-location computing systems and devices. Some embodiments relate to context sharing between multiple systems and devices.

BACKGROUND

Many people interact with more than one computing device each day. Some of these devices are stationary or positioned at fixed locations, including desktop computers, workstations, personal data servers, and televisions. Some of these devices are mobile, including cellular telephones, tablet computers, Ultrabook computers, laptop computers, and music players.

When a user moves away from a stationary computing device but wants to continue to use an application, the user usually locks or shuts down the stationary device and starts a related application afresh on the mobile device. Similarly, when a user arrives at a stationary computing device but wants to continue to use an application from a mobile device, the user usually locks or shuts down the mobile device application and begins a similar application afresh on the stationary device. For example, consider a scenario where a user may be reading a web page article on a home desktop computer, but leaves for the office before he or she can finish reading the article. If the user wishes to continue reading the article on his or her mobile smartphone with internet browsing capability, the user will manually enter the web page article address, and must find his or her location within the article.

Although manual transfer of application context information is possible, this manual transfer can be time consuming, and requires additional steps and configuration by the user. Additionally, while a user may know when he or she is about to leave a stationary computing device, a transfer of application context information may not automatically occur in response to a change of the user's location.

DETAILED DESCRIPTION

Figure 1:
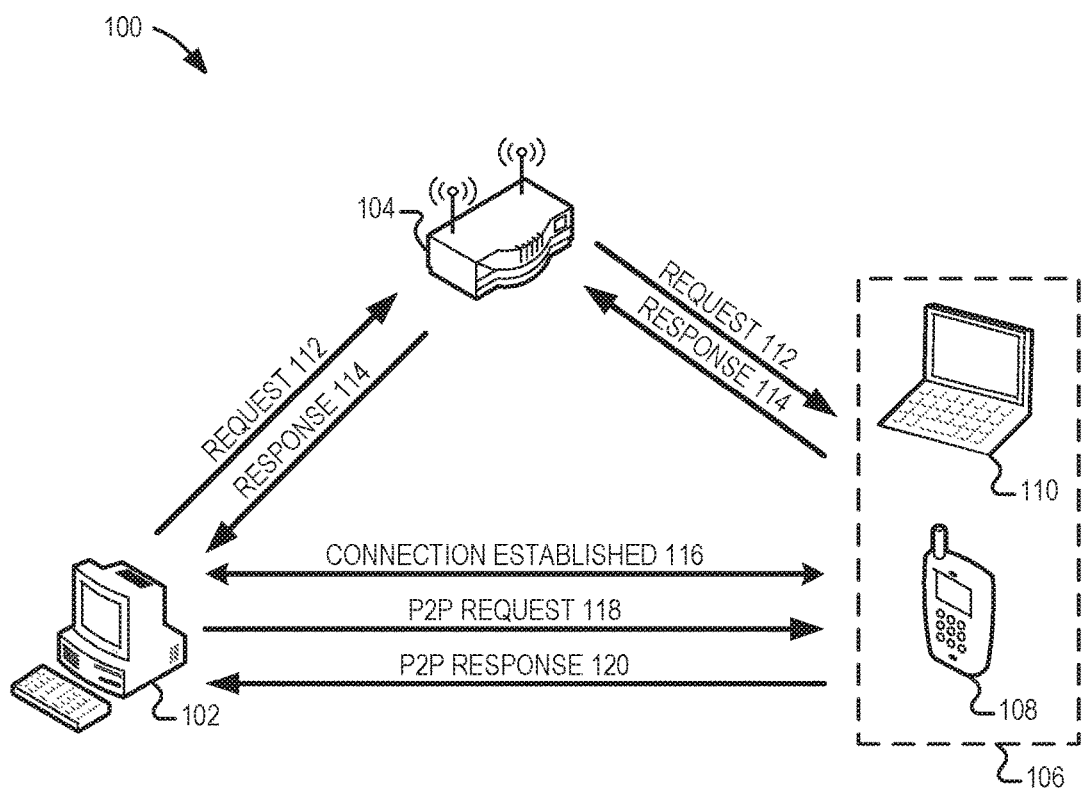
FIG. 1 illustrates an example of device discovery performed over a Wi-Fi network according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for automatic application context sharing across multiple computing devices, with considerations for device capabilities and user preferences. Application context may include summarized or detailed information about activities performed and applications executing on a computing device, such as the location or position within a document being edited, the Universal Resource Locator (URL) of a webpage being accessed, or the time up to which a streaming or downloaded video has been viewed.

With existing technologies, when a user is editing a document on a stationary or fixed-location computing device, the user must manually transfer the document and start a compatible application on a mobile device if the user wants to continue to edit the document on the mobile device after leaving the stationary or fixed-location device. Similarly, if a user watches part of an online streaming video on a stationary computer or television, the user must manually locate the video using the mobile device, and manually seek the same location within the video.

In some of the embodiments described herein, an application context information transfer may detect when the user is physically moving a mobile device away from a stationary or fixed-location computing device (or vice versa), to determine appropriate timing for transferring application context information between the stationary device and the mobile device. These techniques may be used to automate the transfer of application context information, thereby enabling the user to continue using an application without manual intervention or instruction.

The techniques and configurations described herein therefore enable automatic detection of one computing device moving away from another computing device using a wireless communication protocol, and automatic selection and use of a wireless communication protocol (including transfers using the same protocol) to ensure transfer of application context information. Suitable wireless communication protocols may include, for example, Bluetooth or Wi-Fi (e.g., IEEE 802.11 standard) protocols. In some examples, when two devices are connected via a wireless protocol, if either device moves beyond the range of the wireless protocol, the devices are no longer able to transfer information using that wireless protocol. In some of the embodiments described herein, a device may use a first protocol to detect when one computing device is moving away from another, and use a second protocol with a longer communication range to transfer the information. For example, when a device moves beyond the communication range of a Bluetooth protocol, the device can complete an application context information transfer using the longer-range of a Wi-Fi protocol. Such techniques may be used to automate the selection of a wireless communication protocol, thereby ensuring the transfer of application context information while the devices are within the range of another wireless protocol.

FIG. 1 provides an example illustration of device discovery operations 100 within a computing environment. In order to detect proximity and effectuate the application context transfer, subject devices must be aware of each other. In some embodiments, one or more forms of device discovery and device connections may be used within the computing environment. For example, with the use of peer-to-peer (P2P) network connections, devices may be discovered by using standard network scanning procedures. P2P device discovery may include performing operations in a Bluetooth "device discovery" or Wi-Fi "P2P find" modes.

Following device discovery, a device may perform a service discovery to confirm whether discovered devices are capable of application context transfer. In some wireless configurations, the subject devices may not be aware of the presence of other nearby devices. If a device is not aware of the other nearby devices, middleware included on one of the devices may send a multicast message advertising the context transfer feature. If another device receives this multicast message, the middleware on the receiving device may respond by confirming its presence and establishing a connection between the devices.

Device discovery operations 100 occurring in a networked environment may include use of a stationary or fixed location computing device such as a desktop computer 102, a Wi-Fi access point 104, and one or more mobile devices 106. The mobile devices 106 may include a mobile phone 108, a notebook computer 110, or any other self-powered portable computing device. To identify nearby mobile devices, the desktop computer 102 sends a multicast request 112 to the access point 104, and the access point 104 rebroadcasts the multicast request 112 to the mobile devices 106. The mobile devices 106 may provide a multicast response 114 to the access point 104, and the access point 104 may forward the multicast response 114 to the desktop computer 102. Upon receipt of the multicast response 114, the desktop computer 102 may form an established connection 116 with the mobile devices 106.

In another example, device discovery operations 100 may be performed directly between two devices. For example, device discovery may be performed by P2P, decentralized, or direct connect operations over a wireless network protocol, such as Wi-Fi or Bluetooth. Referring to FIG. 1, P2P device discovery may be conducted with a P2P request 118 transmitted from a computing device 102 to the mobile devices 106. If the mobile devices 106 use a compatible P2P protocol, the mobile devices 106 may provide a P2P response 120. Once the P2P response 120 has been received, the desktop computer 102 may form a direct connection 116 with individual of the mobile devices 106. In other examples, P2P device discovery may be initiated by a mobile device to the stationary or fixed location computing device.

Although the term "stationary" or "fixed location" is employed in the present disclosure to contrast such computing devices with "mobile" devices, embodiments are not limited to contexts involving immobile devices. For instance, a laptop, notebook, Ultrabook, tablet, or other mobile-capable or portable computing device may operate as a stationary or fixed location computing device that is currently (or primarily) in use at a particular site or location. Further, a stationary or fixed location device used with device discovery operations 100 is not limited to use of the desktop computer 102, but may include any type of mobile-capable or portable computing device.

Figure 2:
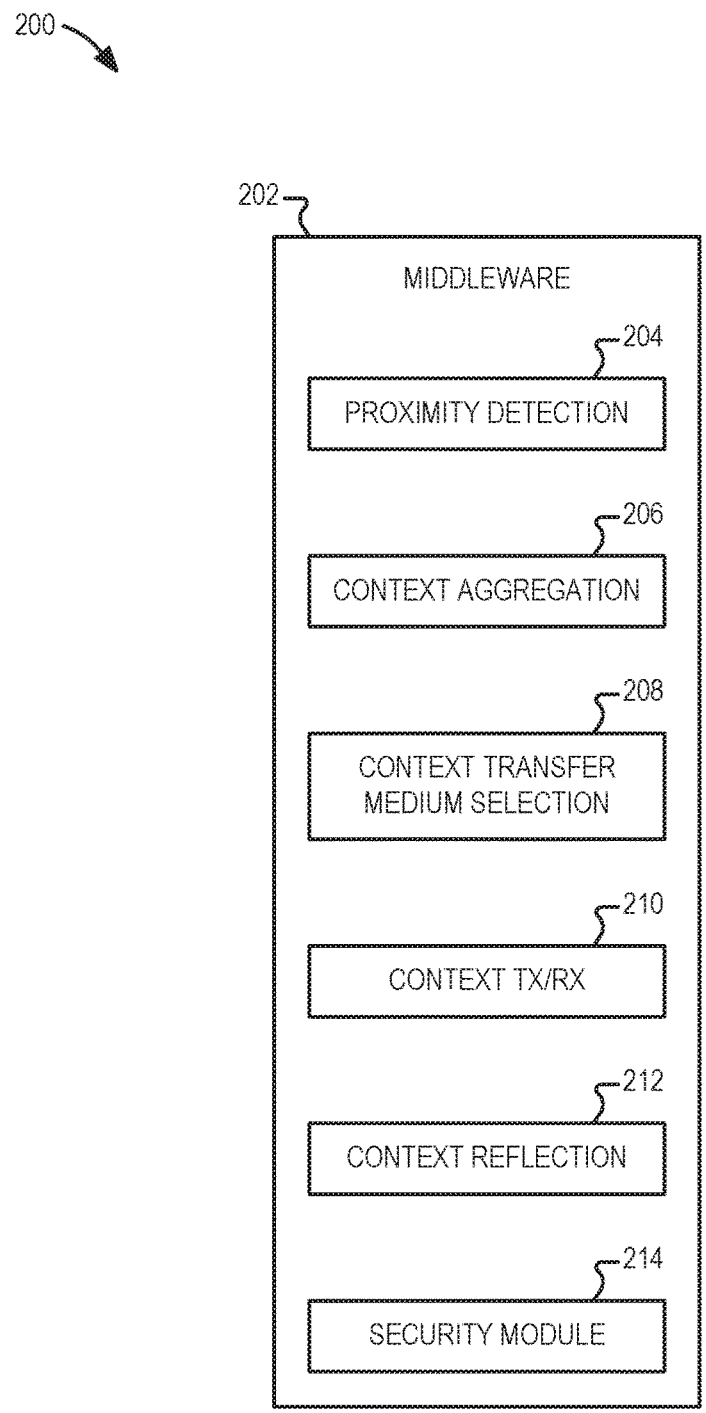
FIG. 2 illustrates example functional modules implemented in middleware layer for execution on user computing devices according to some embodiments.

FIG. 2 provides an example illustration of functional modules 200 embodied in a middleware layer 202 for execution on a user computing device. The middleware layer 202 can be implemented as one or more software applications providing respective services to facilitate automatic context sharing operations. In some embodiments, both the stationary and the mobile computing devices may include the middleware layer 202. The middleware layer may include components to detect device proximity (proximity detection component 204), aggregate application context information (context aggregation component 206), select an appropriate context transfer medium (context transfer medium selection component 208), transfer or receive the application context information (context TX/RX component 210), reflect the application context information in a local application (context reflection component 212), and manage local security and power settings (security module component 214).

Such components may be implemented in middleware installed, executing, or deployed on a device, though software service-based middleware is one of many potential types of application context transfer implementations. Though the present disclosure describes various embodiments in a middleware layer software service, other embodiments may be implemented in one or more other types of application context transfer implementations, including hardware, firmware, software, and the like. Additionally, it will be understood that the various components of the middleware layer 202 may be combined or separated further.

The middleware layer 202 may include a proximity detection component 204. The proximity detection component 204 may detect the current proximity of two devices (whether the devices are in proximity with each other), and may detect whether the devices are moving toward or away from each other. The proximity detection component 204 may continuously monitor the variation in proximity of these devices. In an example, when the middleware layer 202 detects that the user is moving away from his or her desktop computer (removed from proximity to the stationary device), the proximity detection component 204 notifies the context aggregation component 206.

The middleware layer 202 may include a context aggregation component 206. The context aggregation component 206 may aggregate the context of one or more applications, for example, recording the time during playback of a YouTube streaming video. When the proximity detection component 204 determines the user is moving away from his or her desktop computer, proximity detection component 204 notifies the context aggregation component 206, and the context aggregation component 206 automatically aggregates application context information for all active applications.

The middleware layer 202 may include a context transfer medium selection component 208. The communication medium for transferring the context between devices may be decided based on whether the medium is already connected, and how much time would be required for a transfer. If the context data is large or the communication medium available is slow, then the middleware may transfer the context data using another available high-speed communication medium. For example, if the devices were connected using Bluetooth at the time of transfer, the middleware may determine that the context transfer over Bluetooth would not be completed before the devices are out of range of each other. If the middleware determines that context transfer over Bluetooth may not be completed, the middleware in two devices may establish a Wi-Fi connection to transfer the data. The context transfer medium selection component 206 may select which communication medium to use for transferring context information, for example, choosing to use Wi-Fi when a Bluetooth transfer may not be completed while the devices are in range of each other. The middleware layer 202 may include a context TX/RX component 210, which may perform the transfer or receipt of the context information.

In some embodiments, the middleware layer 202 may include a context reflection component 212 to reflect the application context. After receiving the context information, the other device may prompt the user for which applications to continue. If the middleware is unable to find a compatible application, the middleware may store the context information for future use. For example, if the user was preparing a presentation in a desktop computer while reading a webpage, information for both applications may be sent to the mobile device, but the middleware may not reflect the presentation context information until the user arrives at an office work station. Additionally, the application used on one device may not be same in both the devices, so context information may be configured to be application-agnostic. For example, the user may read an article using Internet Explorer on a desktop computer, but may read articles using Safari on an iPhone. The context reflection component 212 may determine how to reflect the context information in the local applications, for example, using web page information from one web browser in a different web browser.

The middleware layer 202 may also include a security module component 214. The security module component 214 may apply security measures after the context is reflected in the new device, for example, by locking a desktop computer or mobile phone, or requiring authentication on the new device before displaying data from the transferred context. The security module component 214 may also implement various power conservation measures, for example, by causing a locked system to enter a low-power mode.

In another example, the mobile computing device may be moved to within close proximity to a stationary computing device. The middleware proximity detection component 204 detects this event and notifies the context aggregation component 206. The context aggregation component 206 automatically aggregates context information application for all active mobile applications, and the context TX/RX component 210 transfers this context information over a wireless connection to the stationary computing device. The stationary computing device may prompt the user to use the application context information in a local application, and if the user confirms this prompt, the middleware initiates the appropriate applications using the context reflection component 212.

Context reflection operations may also be extended beyond a single pair of devices, to include many sets of capable devices. For example, context reflection operations may be used with multiple devices, where the device to transfer and reflect the context can be chosen smartly and automatically on the basis of device capability or on the basis of user confirmation. For example, after coming back from a user's office to a home, the documents open in a user's phone may be reflected to a desktop computer, while online video selections from the phone may be transferred to a television.

Figure 3:
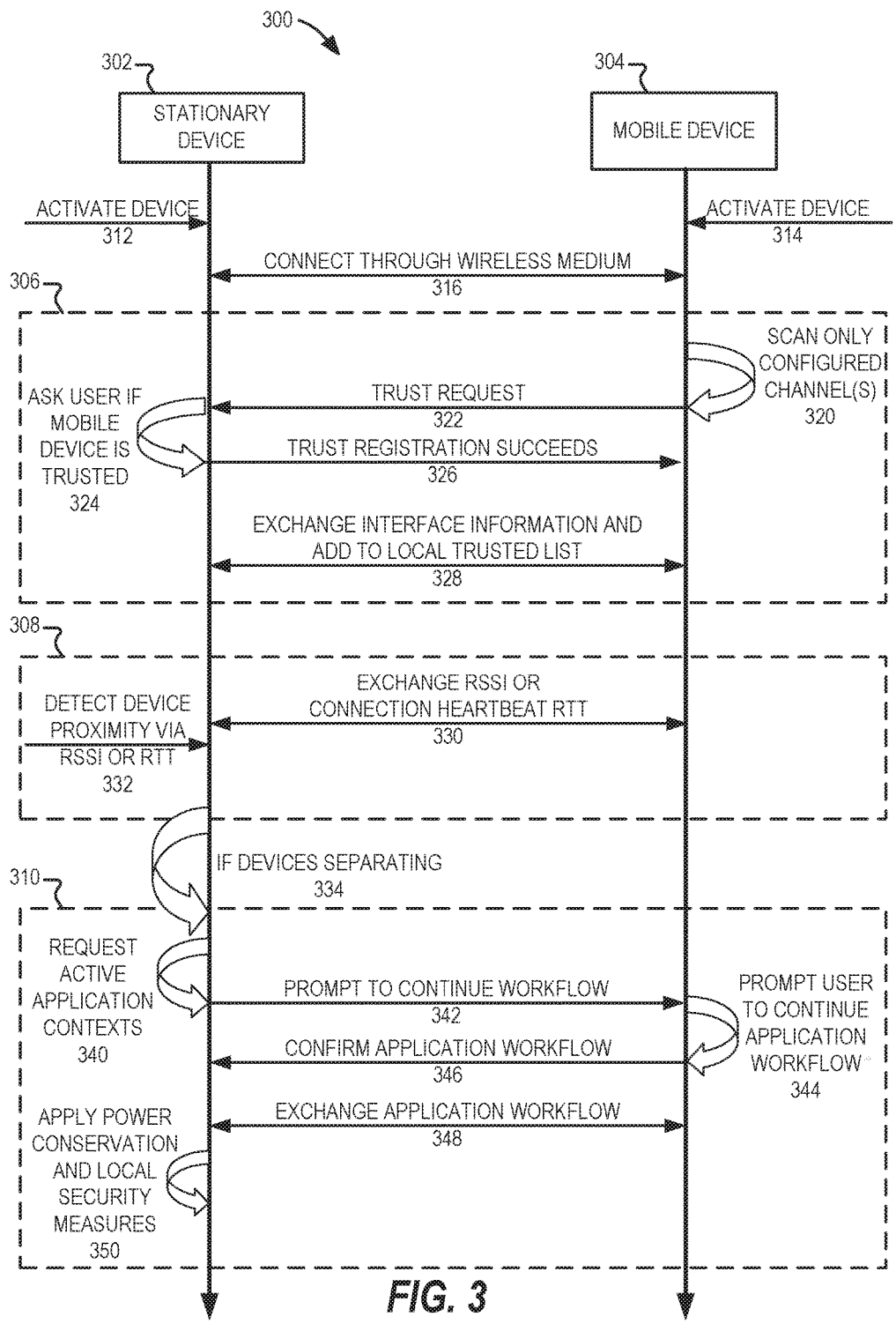
FIG. 3 illustrates an example data flow for device registration, proximity detection, and context transfer according to some embodiments.

FIG. 3 provides an example illustration of a data flow 300 for device discovery, proximity detection, and context transfer, such as between a stationary device 302 and a mobile device 304. Initially, the user may activate the stationary device 312 and activate the mobile device 314. Once activated, the devices may be connected through a wireless medium 316. In some embodiments, the stationary device 302 and mobile device 304 may use security mechanisms to protect the transfer of application context information. In an example, security may be implemented by restricting transfer of application context information to transfers between trusted devices. To designate one or more devices as trusted devices, the middleware may perform a device registration (e.g., a one-time device registration).

The device registration (operation 306) begins with the mobile device scanning for configured channels (operation 320) and sending a trust request 322 to the stationary device 302. If this device connection is the first time that these devices have connected to each other, then they may perform a one-time device registration (operation 306). The user may be prompted to designate a device is trusted during the first connection attempt from that device. If the user confirms the mobile device is trusted (operation 334), the stationary device 302 may send a confirmation that the trust registration succeeded 326 to the mobile device 304. Following this confirmation, the devices may exchange interface information and add each other to the local trusted device list 328.

During device discovery, the middleware may identify and list all devices that are capable of context transfer and that are within the vicinity of the user. Once a user designates a device as a trusted device, the middleware on that device will exchange the information relating to other available communication interfaces. Each device may maintain a trusted device list, where the list contains information about all the interfaces of its trusted devices. In order to enhance security during device discovery or information exchange, the devices may use standard security mechanisms, such as encryption, or key-based or certificate-based authentication.

In some embodiments, the first connection of a device may require the user to designate a device as a trusted device. As a result, the middleware may form a trusted device list. For subsequent connections, the middleware may refer to the trusted device list before attempting any context transfer with other devices. By referring to the trusted device list, the middleware may ensure that only trusted devices exchange application context information. In order to protect against identity theft attacks, the middleware may exchange challenge request and challenge response messages, and these messages may contain authentication measures to ensure only trusted devices exchange application context information. Additional data transfer security may be provided by the link layer security protocol associated with the selected transport medium.

Following device registration (operation 306), devices may perform proximity detection (operation 308). In an embodiment, after two devices are connected, they may use the connection medium to determine their proximity with each other. The two devices may also determine whether they are moving toward each other or moving away from each other. For example, Bluetooth technology may be used to detect changes in proximity. The Middleware may perform Bluetooth proximity detection using Bluetooth Low Energy (BLE) provided by a proximity profile (e.g., as defined by Bluetooth 4.0). A Bluetooth proximity profile requires presence of the Bluetooth Generic Attribute Profile (GATT). Or, the middleware may detect proximity of the devices using a Bluetooth basic rate/enhanced data rate (BR/EDR) ratio on the basis of a Bluetooth Received Signal Strength Indicator (RSSI). For example, Bluetooth RSSI will decrease when devices are moved away from each other. The middleware may determine a minimum communication quality threshold (e.g., a Bluetooth RSSI value) corresponding to simultaneous use of both devices. When the middleware detects a RSSI value below this communication quality threshold, the middleware may conclude the user is moving one device away from another device, and trigger the application context transfer. Bluetooth transmit power may also be used as a communication quality threshold to determine proximity, either in place of or in addition to RSSI proximity detection.

In some embodiments, Wi-Fi may be used to detect proximity. For example, if both the devices are connected using a P2P Wi-Fi connection, then the middleware may use P2P Wi-Fi to determine the proximity of the devices. If both devices are connected to a single legacy (i.e., non-P2P) Wi-Fi Access Point (AP), then the middleware may use legacy Wi-Fi heartbeat packets to determine proximity. Additionally, legacy Wi-Fi heartbeat packets may be used to transfer RSSI information. In order to determine proximity, the middleware may measure the Round Trip Time (RTT) for each heartbeat packet, such that when one device moves away from another device, the RTT of the connection will increase. The middleware may determine a minimum communication quality threshold RTT value corresponding to simultaneous use of both devices, below which the middleware can confirm the devices have separated, and initiate the context transfer. Alternatively, the proximity detection may be based on both RTT and RSSI information. Additionally, if the Wi-Fi module is capable of providing RSSI information of overheard packets, then overheard packet RSSI can be used to determine proximity. Because overheard packet RSSI provides a signal strength measure between the two devices directly, use of overheard packet RSSI may improve proximity detection. In an example, when a user moves to within the range of a home Wi-Fi AP, the middleware may detect that event using the device discovery procedure. In the case of P2P Wi-Fi, middleware may detect proximity using a beacon frame continuously transmitted by a P2P group owner, and may use this proximity detection to trigger a context transfer.

Proximity detection (operation 308) may include the devices exchanging RSSI or connection heartbeat RTT information 330. Using this RSSI or connection heartbeat RTT information (operation 330), the stationary device 302 may continually detect the proximity of the mobile device 304 using RSSI or RTT (operation 332).

If the stationary device 302 determines the mobile device 304 is moving away from the stationary device 302 (operation 334), the stationary device 302 may initiate an application context transfer (operation 310). The application context transfer (operation 310) may begin with the stationary device 302 requesting the application context of all locally active applications (operation 340). The stationary device 302 may then instruct the mobile device 304 to prompt the user to continue the workflow (operation 342). If the user confirms the prompt to continue the workflow (operation 344), the mobile device 304 may send a message to confirm application workflow (operation 346) to the stationary device 302, and the devices may exchange the application workflow (operation 348). Upon completion of the application workflow exchange (operation 348), the stationary device 302 may apply power conservation measures and local security measures (operation 350).

Figure 4:
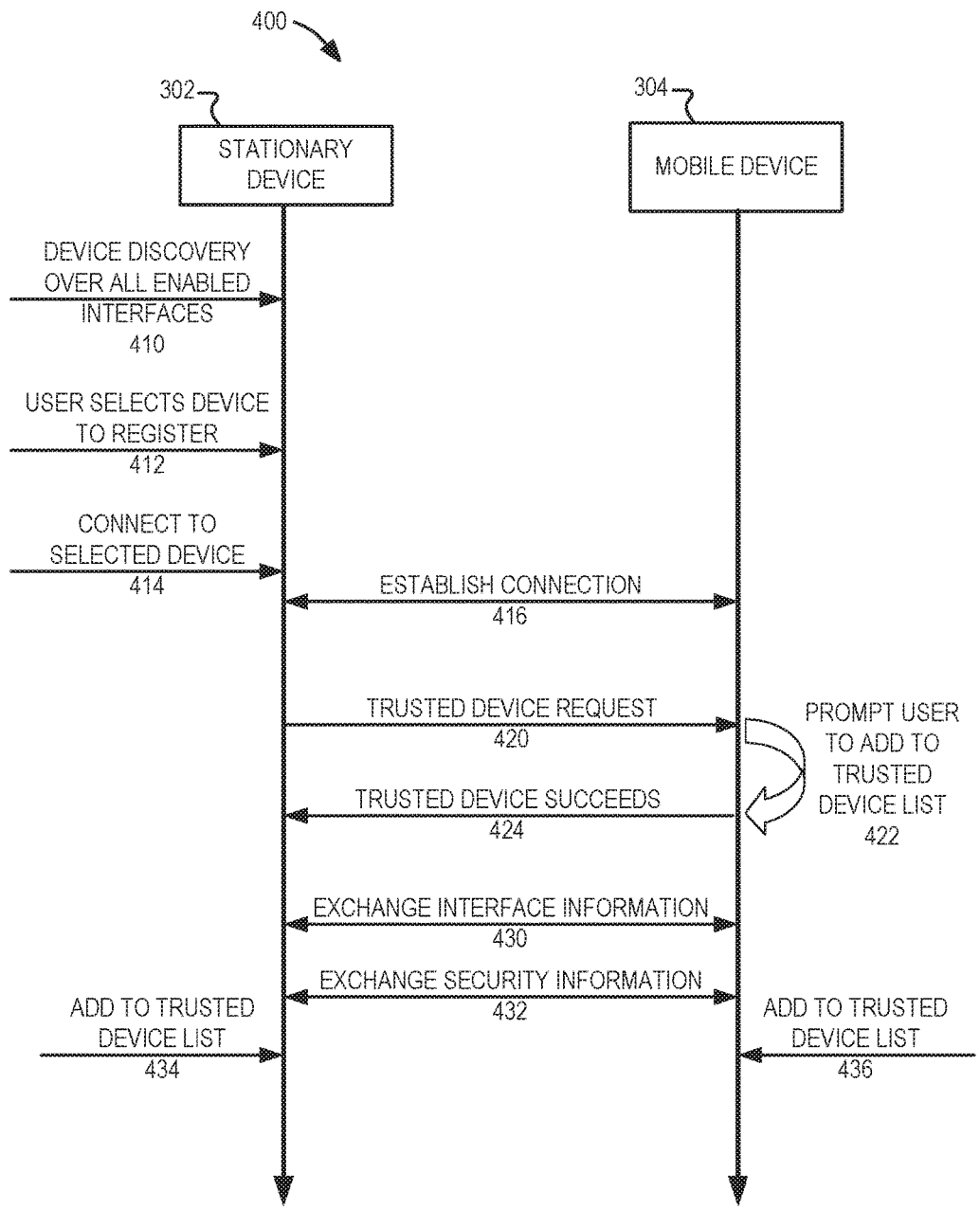
FIG. 4 illustrates an example data flow for device registration according to some embodiments.

FIG. 4 provides an example illustration of a data flow 400 for device registration (such as the device registration operation 306 of FIG. 3), such as between a stationary device 302 and a mobile device 304. Device registration may begin by the user enabling device discovery over all enabled interfaces (operation 410) on the stationary device 302. Following device discovery (operation 410), the user may select a device to register (operation 412) and connect to that selected device (operation 414), establishing a connection (operation 416) between the stationary device 302 and the mobile device 304. Once the connection is established, the stationary device 302 may send a trusted device request (operation 420) to the mobile device 304. Upon receipt of the trusted device request (operation 420), the mobile device 304 may prompt the user to add the stationary device 302 to a list of trusted devices. If the user chooses to add the stationary device 302 to a list of trusted devices, the mobile device 304 may send an indication that the trusted device request succeeded (operation 424) to the stationary device 302. Upon this trusted device success, the devices may exchange interface information (operation 430) and exchange security information (operation 432). Once interface information (operation 430) and security information (operation 432) have been exchanged, the stationary device 302 adds the mobile device 304 to the stationary device's list of trusted devices (operation 434), and the mobile device 304 adds the stationary device 302 to the mobile device's list of trusted devices (operation 436).

Figure 5:
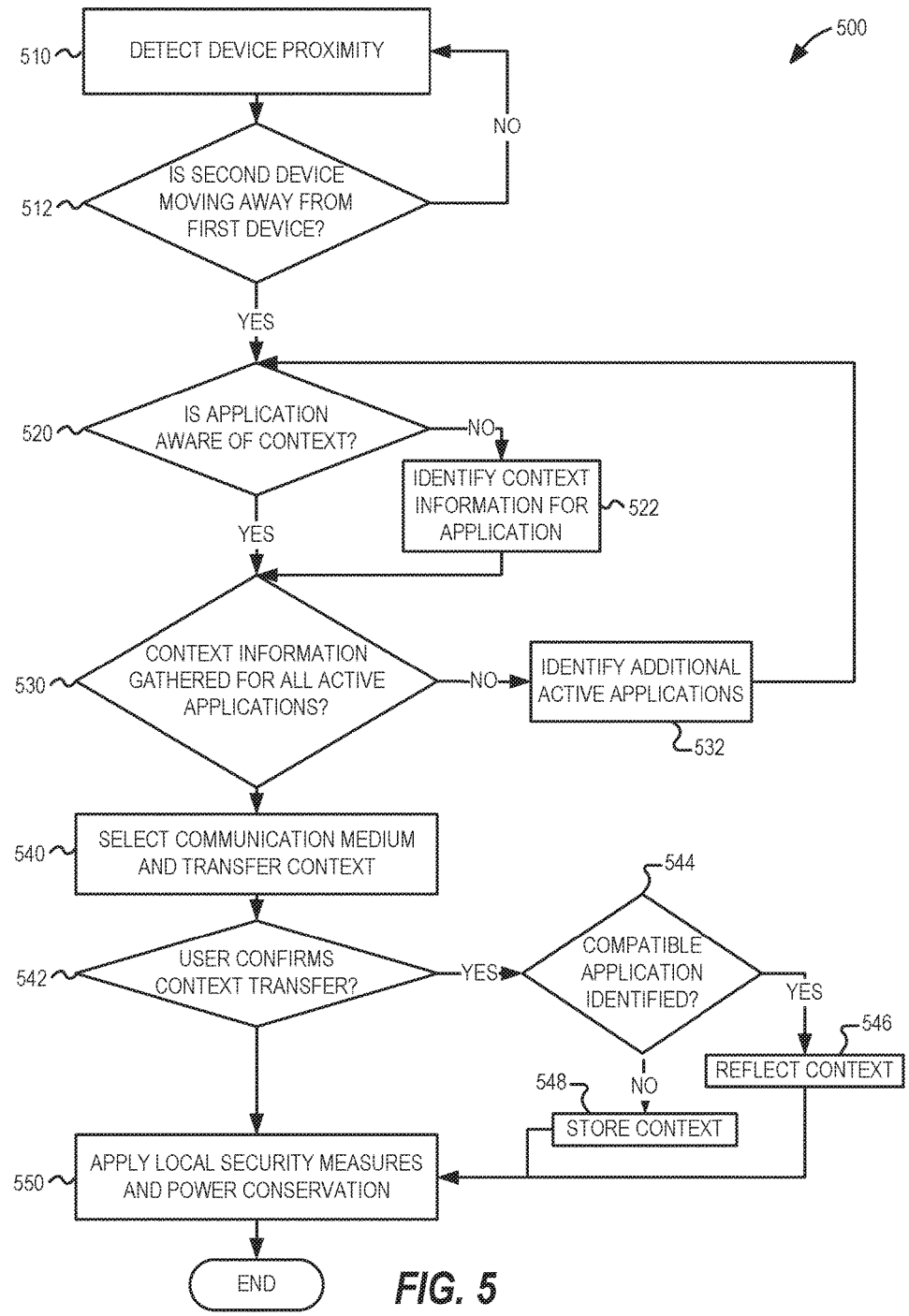
FIG. 5 illustrates an example operation flow for detecting and transferring context according to some embodiments.

FIG. 5 provides an example flowchart of a method 500 for detecting and transferring context (such as may be implemented in connection with the data flow 300 for device discovery, proximity detection, and context transfer illustrated in FIG. 3). Once a first device has been configured to detect the proximity of a second device (operation 510), the first device begins by determining if the second device is moving away from the first device (operation 512). If the second device is not moving away from the first device, the first device continues to detect the proximity of the two devices (operation 510). If the second device is moving away from the first device, the first device identifies if an application is aware of its context (operation 520).

To resume an application on a secondary device, the application may support context detection and transfer. For example, context detection for playing a video on a streaming video website such as YouTube would require the first YouTube viewing application to provide information about the time up to which the user had watched the video; after context transfer, the mobile device can resume the video from the same time. For applications that do not support context detection of the viewing time, a YouTube video may be played from the beginning. Using this context detection, applications may be categorized as either context-aware or context-unaware. At the time of context transfer, middleware may query context-aware applications to accumulate relevant data and control information, and context-aware application may return the context information to the middleware. For context-aware applications, the transferred context will be precise. For context-unaware applications, the middleware may collect the available relevant data to replicate the same context in other device. For example, a context-unaware browser application may collect the latest visited webpage, send the webpage information to another device, and the other device may open the same webpage.

If the application is context-unaware, then the application context information is gathered (operation 522). Once context information has been gathered from either context-aware or context-unaware applications, the first device determines whether context information has been gathered for all active applications (operation 530). If context information has not been gathered for all active applications, the first device identifies additional active applications (operation 532), and begins detection of context awareness for that application (operation 520). If context information has not been gathered for all active applications, then the first device selects the communication medium and transfers the context information to the second device (operation 540).

In some examples, a configurable parameter provided in middleware enables a seamless context transfer experience without user prompts, to automatically reflect all or selected contexts among capable devices. In other examples, once the context information has been transferred, the user may be prompted to confirm the context transfer (operation 542). Such a context transfer prompt occurs after the completion of transfer to ensure transfer can be completed while the devices are in range of each other. If the user confirms the context transfer, then the second device identifies whether it has an application compatible with the transferred context information (operation 544). If the second device has an application compatible with the transferred context information, the second device reflects the context information (operation 546). If the second device does not have an application compatible with the transferred context information, the second device stores but does not reflect the context information (operation 548). After the context information has been transferred and stored or reflected, the devices may apply local power conservation and local security measures (operation 550).

Figure 6:
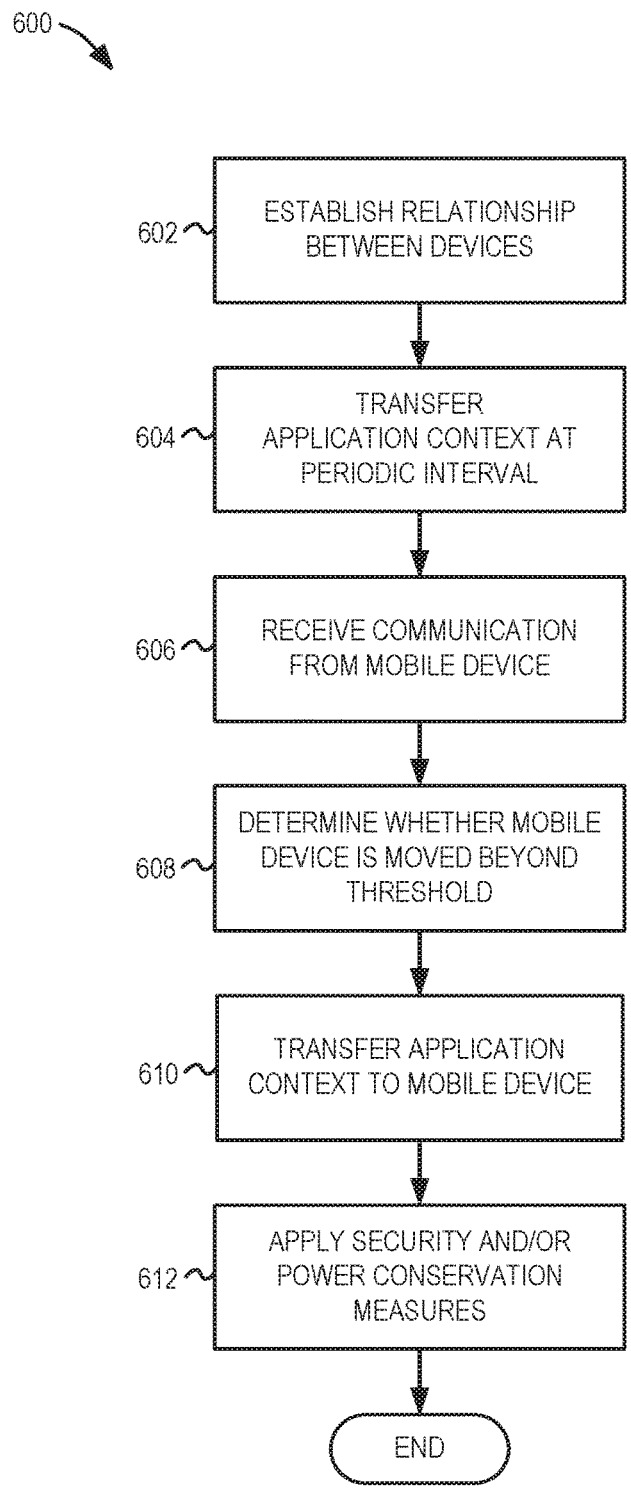
FIG. 6 illustrates an example method for performing wireless application context transfer according to some embodiments.

FIG. 6 provides an example illustration of a method for application context transfer operations 600 within a computing environment, implementing portions of the data flows 300, 400 from FIGS. 3 and 4. In some embodiments, one or more forms of application context transfer may be available within the computing environment.

Application context transfer operations may be preceded by establishing a relationship between devices (operation 602). For example, operations to establish the relationship may include broadcasting a multicast trust message from a stationary device to all nearby devices using a wireless communication medium. The user may confirm the trust message on a mobile device, and the mobile device may respond to the multicast message with a trust confirmation message. Upon receipt of the trust confirmation message, the devices may exchange security information and add each other to a local list of trusted devices.

In an example, the stationary device may transfer application context to the mobile device (or each device may exchange application context with each other) at a pre-defined periodic interval (operation 604). This transfer may occur whenever the two devices are within wireless communication range, and need not be triggered by communication between the two devices. This periodic transfer of application context would minimize the amount of information necessary for application context transfer when the mobile device is physically moved away from the stationary device.

When a mobile device is on the stationary device's list of trusted devices, the stationary device may record and analyze a Received Signal Strength Indicator (RSSI) or Round Trip Time (RTT) (operation 606) to determine whether the mobile device has moved beyond a determined threshold (or has a communication/link quality measurement decreasing below a threshold) (operation 608). In an example, when the mobile device is physically moved away from the stationary device, the RSSI may indicate a decrease in the signal strength, or the RTT may indicate an increase in the round-trip communication delay. By recording and analyzing this RSSI or RTT information, the stationary device may establish a threshold RSSI or RTT value. The threshold may indicate that the mobile device is moving away from the stationary device, but that the two devices are still within wireless communication range of each other using the same protocol. In another example, if the devices are able to communicate using two different protocols, the threshold may indicate that the mobile device has moved beyond the range of a first wireless protocol, but is still within range of a second wireless protocol. The stationary device may continuously monitor RSSI or RTT information received via communication from the mobile device (operation 606). The stationary device may use the RSSI or RTT information to determine when the mobile device has moved beyond the threshold (operation 608).

In an example, when the stationary device determines the mobile device has moved beyond the communication quality threshold (operation 608), the stationary device may determine whether the application context transfer can be completed while the devices are within wireless communication range. This determination may be based on, for example, how much information has been transferred through periodic application context transfers, the expected time between crossing the communication quality threshold and losing wireless connectivity, link quality, or the speed of the wireless communication medium. Operations then may be conducted to transfer the application context to the mobile device (operation 610). If the application context transfer can be completed while the devices are in range, the stationary device may transfer application context using the current wireless communication medium. If the application context transfer cannot be completed while the devices are in range of a common wireless communication medium, the stationary device may transfer application context using an alternate wireless communication medium. As suggested by a previous example, when mobile device moves beyond the range of the Bluetooth protocol, the device could complete an application context information transfer using the longer-range of the Wi-Fi protocol. Once the application context has been transferred, the stationary device (or the mobile device) may apply local security measures or apply local power conservation measures (operation 612).

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
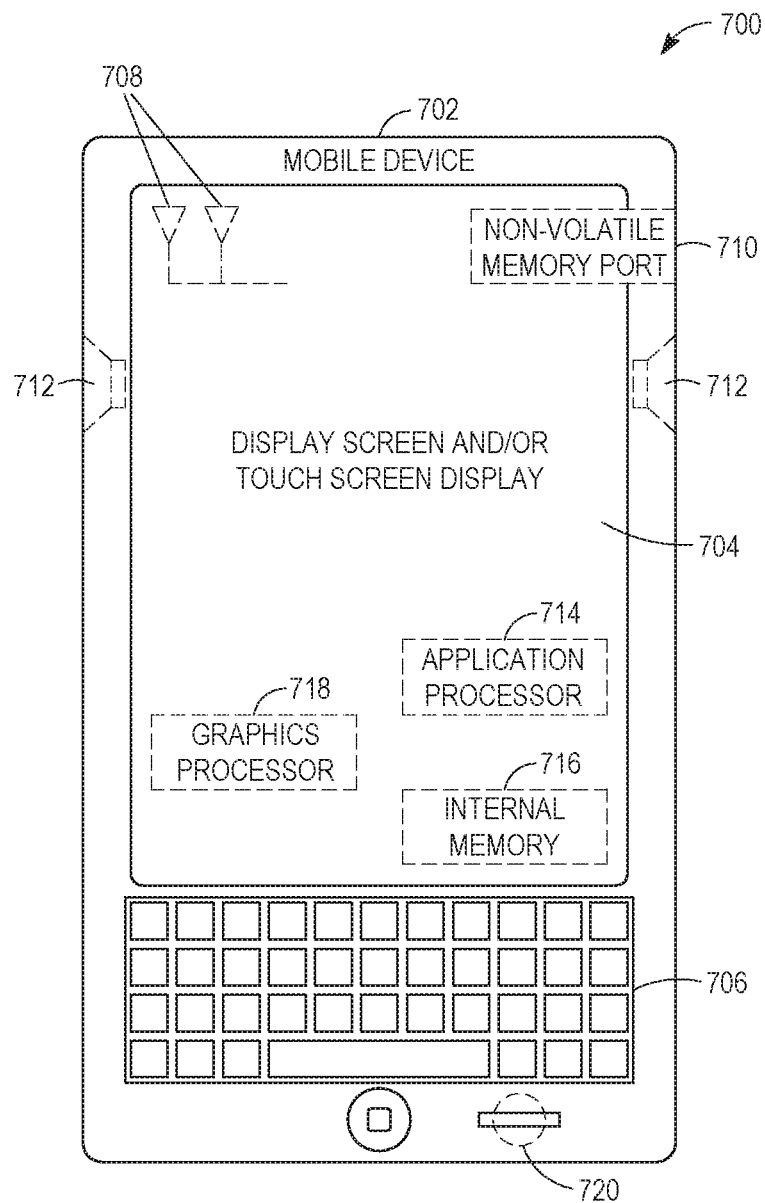
FIG. 7 illustrates an example mobile device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device 700 may include one or more antennas 708 configured to communicate with a base station (BS), an evolved Node B (eNB), or other type of wireless wide area network (WWAN) access point. The mobile device may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device 700 may communicate in a wireless local area network (WLAN), a wireless personal area network (WPAN), and/or a wireless wide area network (WWAN).

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
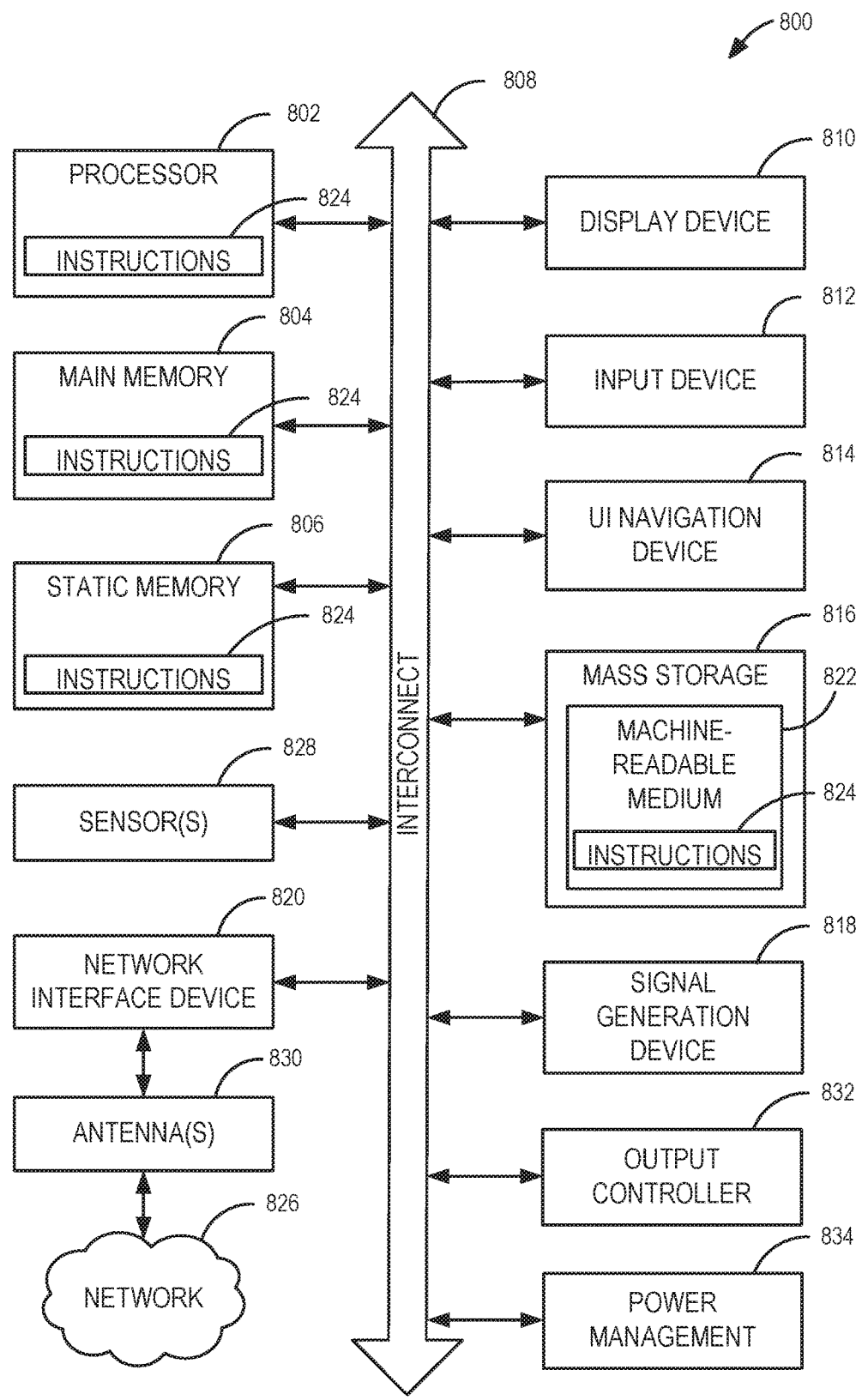
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be embodied as the computing device 104, mobile device 106, mobile device 700 (from FIGS. 1 and 7), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method for application context transfer between devices, comprising: determining a communication quality threshold within a wireless communication range of a wireless protocol, the wireless protocol used to conduct wireless communications between a first device and a second device when the second device is located in proximity to the first device; receiving, at the first device, a communication from the second device conducted via the wireless protocol; determining the second device is being removed from proximity to the first device when the communication received from the second device decreases below the communication quality threshold; and transferring, from the first device to the second device using a wireless communication, an application context of a software application operating on the first device, responsive to determining the second device is being removed from proximity to the first device.

In Example 2, the subject matter of Example 1 can optionally include the application context including context information for content in an internet accessible application operating on the first device, and wherein the second device accesses the content in an internet accessible application on the second device using the context information responsive to determining transferring of the application context is complete.

In Example 3, the subject matter of one or any combination of Examples 1-2 can optionally include the communication received from the mobile device including a wireless signal strength indication, and wherein determining whether the second device is being removed from proximity to the first device includes comparing the wireless signal strength indication to the communication quality threshold.

In Example 4, the subject matter of one or any combination of Examples 1-3 can optionally include the wireless signal strength indication being determined from a Received Signal Strength Indication (RSSI) value included in the communication received from the second device, the wireless communication conducted according to a standard from an IEEE 802.11 standards family, or a standard from a Bluetooth standards family.

In Example 5, the subject matter of one or any combination of Examples 1-4 can optionally include sending, from the first device, a transmission to the second device via the wireless protocol to invoke transmission of the communication from the second device; wherein the wireless signal strength indication is determined using a round trip time of communications between the first device and the second device; and wherein the first device is a stationary computing device located at a fixed location, and wherein the second device is a mobile computing device portable to multiple locations.

In Example 6, the subject matter of one or any combination of Examples 1-5 can optionally include establishing a trusted connection between the first device and the second device, prior to conducting the wireless communications between the first device and the second device via the wireless protocol.

In Example 7, the subject matter of one or any combination of Examples 1-6 can optionally include establishing the trusted connection by: sending a multicast message to the second device; receiving a unicast message from the second device in response to the multicast message, indicating user confirmation received at the second device that the first device is a trusted device; sending a first set of security information to the second device; receiving a second set of security information from the second device; and adding the second device to a listing of one or more trusted devices.

In Example 8, the subject matter of one or any combination of Examples 1-7 can optionally include receiving connection information for the second device via a network; and communicating directly with the second device independent of the network using a peer-to-peer network connection established with the connection information.

In Example 9, the subject matter of one or any combination of Examples 1-8 can optionally include transferring, at a periodic interval, application context information to the second device from the software application operating on the first device.

In Example 10, the subject matter of one or any combination of Examples 1-9 can optionally include transferring of the application context from the first device to the second device is performed by a wireless communication conducted via a second wireless protocol, the second wireless protocol differing from the wireless protocol.

In Example 11, the subject matter of one or any combination of Examples 1-10 can optionally include the wireless protocol is defined by a standard from a Bluetooth standards family, and wherein the second wireless protocol is defined by a standard from an IEEE 802.11 standards family.

In Example 12, the subject matter of one or any combination of Examples 1-11 can optionally include the application context being transferred using the second wireless protocol responsive to determining that the transferring of the application context cannot be completed before the second device is moved beyond the wireless communication range of the wireless protocol.

Example 13 can include, or can optionally be combined with the subject matter of one or any combination of Examples 1-12 to include a computing device, comprising: a processor; a memory; an antenna; a display; a wireless network adapter operably coupled to the antenna, and arranged to conduct a communication with a second computing device using the antenna using a first wireless communications medium; and an application context transfer component operably coupled to the processor and memory, and arranged to: determine a communication quality threshold within a wireless communication range for wireless communications with the second computing device, the wireless communications conducted using the wireless network adapter via the first wireless communications medium; process one or more wireless communications received from the second computing device via the first wireless communications medium; determine, using the one or more wireless communications received from the second computing device, whether quality of the one or more wireless communications with the second computing device cross a communication quality threshold; and transfer, between the computing device and the second computing device, an application context of a software application with a second wireless communication via the wireless network adapter, responsive to determining the quality of the one or more wireless communications with the second computing device cross a communication quality threshold.

In Example 14, the subject matter of Example 13 can optionally include the wireless network adapter being further arranged to receive a wireless signal strength indication from the second computing device, and the application context transfer component further arranged to determine whether quality of the one or more wireless communications cross the communication quality threshold using the wireless signal strength indication.

In Example 15, the subject matter of one or any combination of Examples 13-14 can optionally include the application context transfer component being further arranged to transfer the application context through a second wireless communication medium, responsive to determining the transfer of the application context cannot be completed via the first wireless communications medium.

In Example 16, the subject matter of one or any combination of Examples 13-15 can optionally include the computing device being a mobile computing device, wherein operations to determine whether quality of the one or more wireless communications with the second computing device cross the communication quality threshold include determining whether quality of the one or more wireless communications exceed the communication quality threshold, causing transfer of the application context from the mobile computing device to the computing device.

In Example 17, the subject matter of one or any combination of Examples 13-16 can optionally include the second computing device being a mobile computing device, wherein operations to determine whether quality of the one or more wireless communications with the second computing device cross the communication quality threshold include determining whether quality of the one or more wireless communications fall below the communication quality threshold, causing transfer of the application context from the computing device to the mobile computing device.

Example 18 can include, or can optionally be combined with the subject matter of one or any combination of Examples 1-17 to include a mobile device, comprising: a wireless network adapter arranged to conduct a wireless communication with a computing device at a fixed location according to a wireless network protocol; and an application context transfer module operably coupled to a processor and a memory of the mobile device, and arranged to obtain an application context from the computing device via the wireless network adapter, the application context transfer module configured to perform operations including: receiving the application context from the computing device using the wireless communication, responsive to the computing device determining the mobile device has moved into a communication range of the computing device using the wireless network protocol; and determining whether the mobile device has a software application to perform the application context.

In Example 19, the subject matter of Example 18 can optionally include the application context transfer module being further configured to perform operations including: prompting the user to start an software application associated with application context information in the transferred application context, responsive to determining the mobile device has a software application to perform the application context; and storing the application context information, responsive to determining the mobile device does not have a software application to perform the application context.

In Example 20, the subject matter of one or any combination of Examples 18-19 can optionally include the application context being maintained at the computing device responsive to determining the mobile device does not have a software application to perform the application context.

In Example 21, the subject matter of one or any combination of Examples 18-20 can optionally include the application context transfer module being further configured to perform operations including: applying a local security measure at the mobile device responsive to determining transfer of the application context information to the mobile device is complete; requesting confirmation by the user for display of the application context at the mobile device; and starting an application associated with application context at the mobile device, responsive to the user confirming display of the application context.

Example 22 can include, or can optionally be combined with the subject matter of one or any combination of Examples 1-21, to include at least one machine readable storage medium comprising a plurality of instructions that, in response to being executed on a computing device, cause the computing device to: determine a communication quality threshold within a wireless communication range of a wireless protocol, the wireless protocol used to conduct wireless communications between a computing device at a fixed location and a mobile device when the mobile device is located in proximity to the computing device; receive, at the computing device, a communication from the mobile device conducted via the wireless protocol; determine the mobile device is being removed from proximity to the computing device when the communication received from the mobile device decreases below the communication quality threshold; and transfer, from the computing device to the mobile device using a wireless communication, an application context of a software application operating on the computing device, responsive to determining the mobile device is being removed from proximity to the computing device.

In Example 23, the subject matter of Example 22 can optionally include the machine readable storage medium further arranged to: receive a wireless signal strength indication from the mobile device wherein the wireless signal strength indication is determined from a Received Signal Strength Indication (RSSI) value included in the communication received from the mobile device, and wherein the communication received from the mobile device is provided according to a standard from an IEEE 802.11 standards family, or a standard from a Bluetooth standards family; and determine whether the mobile device is being removed from proximity to the computing device by comparing the wireless signal strength indication to the communication quality threshold.

What is claimed is:

1. A method for an application context transfer between devices, comprising:
   determining, at a first device, that a second device is within a nearby wireless communication range of the first device to identify the second device using a nearby wireless protocol, the nearby wireless protocol used to conduct wireless communications between the first device and the second device when the second device is located in proximity to the first device;
   determining whether the second device is being removed from proximity to the first device using the nearby wireless protocol; and
   transferring, from the first device to the second device using the nearby wireless protocol, the application context including context of a software application operating on the first device, when the second device is within the nearby wireless communication range of the first device, in response to determining the second device is being removed from proximity to the first device, wherein the communication received from the second device includes a wireless signal strength indication, and wherein determining whether the second device is being removed from proximity to the first device includes using the wireless signal strength indication.

2. The method of claim 1, wherein the application context includes context information for content in an Internet accessible application operating on the first device, and wherein the second device accesses the content in an Internet accessible application on the second device using the context information responsive to determining transferring of the application context is complete.

3. The method of claim 1, wherein the wireless signal strength indication is determined from a Received Signal Strength Indication (RSSI) value included in a communication received from the second device, the wireless communication conducted according to a standard from an IEEE 802.11 standards family, or a standard from a Bluetooth standards family.

4. The method of claim 1, further comprising:
   sending, from the first device, a transmission to the second device via the nearby wireless protocol to invoke transmission of the communication from the second device;
   wherein the wireless signal strength indication is determined using a round trip time of communications between the first device and the second device; and
   wherein the first device is a stationary computing device located at a fixed location, and wherein the second device is a mobile computing device portable to multiple locations.

5. The method of claim 1, further comprising:
   establishing a trusted connection between the first device and the second device, prior to conducting the wireless communications between the first device and the second device via the wireless protocol.

6. The method of claim 5, wherein establishing the trusted connection includes:
   sending a multicast message to the second device;
   receiving a unicast message from the second device in response to the multicast message, indicating user confirmation received at the second device that the first device is a trusted device;
   sending a first set of security information to the second device;
   receiving a second set of security information from the second device; and
   adding the second device to a listing of one or more trusted devices.

7. The method of claim 1, further comprising:
   transferring, at a periodic interval, application context information to the second device from the first device.

8. The method of claim 1, wherein the nearby wireless protocol is a near field communication protocol.

9. The method of claim 1, wherein the application context is transferred using a second wireless protocol responsive to determining that the transferring of the application context cannot be completed before the second device is moved beyond the nearby wireless communication range of the nearby wireless protocol, the second wireless protocol defined by a standard from a Bluetooth standards family or a standard from a WiFi standards family.

10. The method of claim 9, wherein the application context is transferred using a third wireless protocol responsive to determining that the transferring of the application context cannot be completed before the second device is moved beyond a second wireless communication range of the second wireless protocol, the third wireless protocol defined by a standard from an IEEE 802.11 standards family.

11. An apparatus of a wireless communication device, the apparatus comprising:
    a memory; and
    processing circuitry configured to:
    determine that a nearby device is within a nearby wireless communication range of the wireless communication device to identify the nearby device using a nearby wireless protocol, the nearby wireless protocol used for wireless communications between the wireless communication device and the nearby device, when the nearby device is nearby the wireless communication device;

determine, whether the nearby device is moving away from the wireless communication device using the nearby wireless protocol; and transfer, from the wireless communication device to the nearby device, an application context including context of a software application operating on the wireless communication device, using the nearby wireless protocol when the nearby device is within the nearby wireless communication range of the wireless communication device, in response to determining the nearby device is moving away from the wireless communication device; and a wireless network adapter arranged to receive a wireless signal strength indication from the nearby device, wherein the processing circuitry further arranged to determine the nearby device is moving away from the wireless communication device using the wireless signal strength indication.

12. The apparatus of claim 11, the processing circuitry further arranged to transfer the application context through a second wireless communication protocol, responsive to determining the transfer of the application context cannot be completed via the nearby wireless communications protocol.

13. The apparatus of claim 11, wherein the nearby device is a mobile wireless device, wherein operations to determine whether the nearby device is moving away from the wireless communication device include determining whether quality of the wireless communications between the wireless communication device and the nearby device fall below a communication quality threshold, causing transfer of the application context from the wireless communication device to the mobile wireless device.

14. The apparatus of claim 11, wherein the nearby wireless protocol is a near field communication protocol.

15. The apparatus of claim 11, wherein the memory is further configured to store the application context.

16. At least one non-transitory machine readable storage medium comprising a plurality of instructions that, in response to being executed by processing circuitry of a wireless communication device, configure the processing circuitry to:

determine that a mobile device is within a nearby wireless communication range of the wireless communication device to identify the mobile device using a nearby wireless protocol, the nearby wireless protocol used to conduct wireless communications between the wireless communication device at a fixed location and the mobile device when the mobile device is located in proximity to the wireless communication device;

determine whether the mobile device is being removed from proximity to the wireless communication device using the nearby wireless protocol;

transfer, from the wireless communication device to the mobile device using the nearby wireless protocol, an application context including context of a software application operating on the wireless communication device, when the mobile device is within the nearby wireless communication range of the wireless communication device, in response to determining the mobile device is being removed from proximity to the wireless communication device;

receive a wireless signal strength indication from the mobile device wherein the wireless signal strength indication is determined from a Received Signal Strength Indication (RSSI) value included in a communication received from the mobile device; and determine whether the mobile device is being removed from proximity to the wireless communication device by using the wireless signal strength indication.

17. The at least one non-transitory machine readable storage medium of claim 16, wherein the application context is transferred using a second wireless protocol responsive to determining that the transferring of the application context cannot be completed before the mobile device is moved beyond the nearby wireless communication range of the nearby wireless protocol, the second wireless protocol defined by a standard from a Bluetooth standards family or a standard from a WiFi standards family.

18. The at least one non-transitory machine readable storage medium of claim 16, wherein the nearby wireless protocol is a near field communication protocol.

* * * * *